United States Patent Office
3,816,412
Patented June 11, 1974

3,816,412
STEROIDAL AZOLIDE-1-CARBOXYLATES
Kenneth Earl Fahrenholtz, Bloomfield, N.J., assignor to
Hoffmann-La Roche Inc., Nutley, N.J.
No Drawing. Filed Apr. 28, 1972, Ser. No. 248,363
Int. Cl. C07c 173/10
U.S. Cl. 260—239.5    9 Claims

ABSTRACT OF THE DISCLOSURE

Azolide-1-carboxylates and thionecarboxylates of a $3\beta$-hydroxy, $17\beta$-hydroxy or 21-hydroxy steroid which are useful as progestational, androgenic, esterogenic, anabolic and/or antigonadotropic agents.

SUMMARY OF THE INVENTION

In accordance with this invention, it has been discovered that a steroidal azolide-1-carboxylate selected from the group consisting of compounds of the formulae:

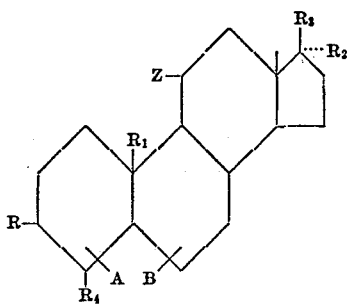

I

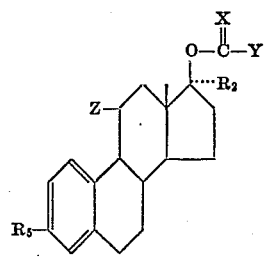

II and

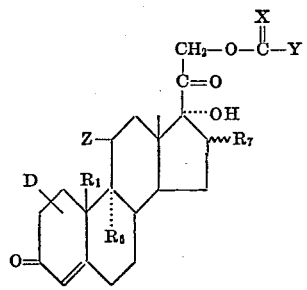

III wherein R is hydroxy, oxo, acetoxy, carbamate, or

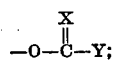

$R_1$ is hydrogen or methyl; $R_2$ is hydrogen, lower alkyl or ethynyl; $R_3$ is hydroxy or

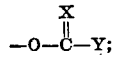

$R_4$ is hydrogen or chlorine; $R_5$ is lower alkoxy or cycloalkoxy; $R_6$ is hydrogen or fluorine; $R_7$ is hydrogen or lower alkyl; X is sulfur or oxygen; Y is a 1-substituted azolide; Z is hydrogen, hydroxy or oxo; A is a $\Delta^{4(5)}$-unsaturated bond or B is a $\Delta^{5(6)}$-unsaturated bond;

and D can be a $\Delta^{1(2)}$-unsaturated bond; with the proviso that one and only one of R and $R_3$ is

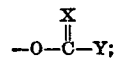

exhibit endocrine activity. All compounds of formula I exhibit androgenic, anabolic, progestational and/or antigonadotropic activity. All compounds of formula II exhibit estrogenic activity. All compounds of formula III exhibit thymolytic activity.

DETAILED DESCRIPTION OF THE INVENTION

As used throughout this application, the term "lower alkyl" comprehends straight chain and branched chain saturated hydrocarbon groups having 1 to 7 carbon atoms such as methyl, ethyl and isopropyl. As used herein, the term "ethynyl" comprehends unsubstituted ethynyl groups and ethynyl groups 2-substituted with a lower alkyl group or an ethynyl group, such as 1-propynyl, 1-butynyl and 1,3-buta-diynyl. The preferred ethynyl group is unsubstituted ethynyl.

As also used throughout this application, the term "aryl" comprehends mono-nuclear aromatic hydrocarbons such as phenyl and tolyl, preferably phenyl, which can also be unsubstituted or substituted in one or more positions with a nitro, halo, lower alkyl or lower alkoxy group. As also used herein, the term "lower alkoxy" comprehends alkoxy groups having 1 to 7 carbon atoms, preferably 1 to 4 carbon atoms such as ethoxy and methoxy. As further used herein, the term "cycloalkoxy" comprehends groups having 3 to 6 carbon atoms, preferably 5 to 6 carbon atoms, such as cyclopentyloxy. As still further used herein, the term "halogen" comprehends chlorine, bromine, fluorine or iodine, unless otherwise stated.

As also used throughout this application, the term "carbamate" comprehends a group of the formula:

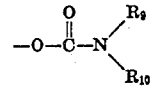

wherein $R_9$ and $R_{10}$ are hydrogen, lower alkyl, lower alkenyl or aryl.

The preferred carbamate groups include those wherein $R_9$ is hydrogen, methyl, ethyl or phenyl and $R_{10}$ is hydrogen, methyl, or ethyl.

As further used throughout this application, the term "azolide" comprehends 5-membered heterocyclic groups containing two or three nitrogen atoms in the ring. The ring may be unsubstituted or substituted on one or more carbon atoms with a lower alkyl or lower alkenyl substituent group or two adjacent substituent groups may form a cyclohexene or a cyclohexadiene moiety. The preferred azolide groups include the groups derived from the azole compounds imidazole, benzimidazole, pyrazole and triazole, particularly imidazole.

In accordance with this invention, among the preferred compounds of formula I are the compounds of the formula:

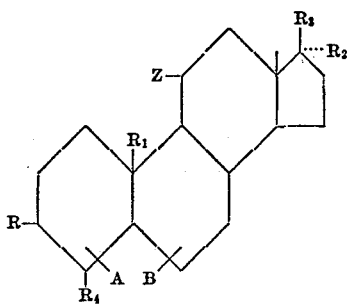

I-A wherein R, $R_1$, $R_2$, $R_3$, and $R_4$ are as above.

Among these compounds of formula I–A, especially preferred are the compounds of the formula:

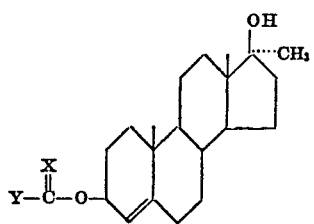

I–B wherein X and Y are as above;

particularly compounds of the formula:

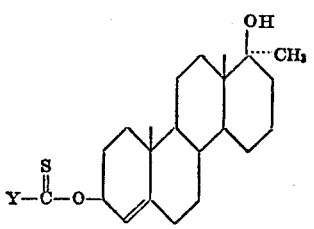

I–C wherein Y is as above;

which have antigonadotropic, anabolic and androgenic activity.

Also among the compounds of formula I–A, especially preferred are the compounds of the formula:

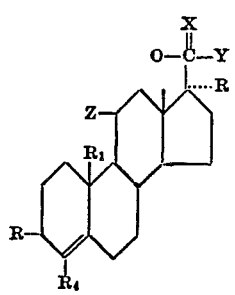

I–D wherein R, $R_1$, $R_2$, $R_4$, X, Y and Z are as above.

Among the compounds of formula I–D, particularly preferred are the compounds of the formula:

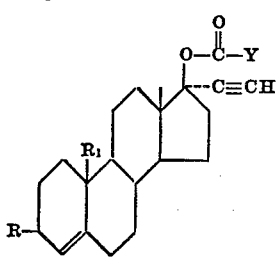

I–E wherein R, $R_1$ and Y are as above;

which are progestationally, as well as androgenically and anabolically, active, quite particularly 17α-ethynyl-17β-hydroxyestr-4-en-3-one imidazole-1-carboxylate. Also among the compounds of formula I–D, particularly preferred are the compounds of the formula:

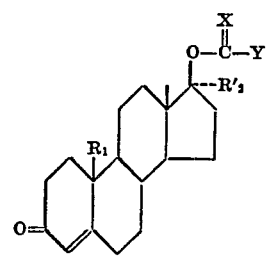

I–F wherein $R_1$, X and Y are as above; and $R'_2$ is hydrogen or lower alkyl;

which are antigonadotropically as well as androgenically active.

Also, in accordance with this invention, among the preferred compounds of formula II are the compounds of the formula:

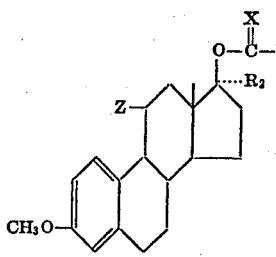

II–A wherein $R_2$, X, Y and Z are as above;

particularly compounds of the formula:

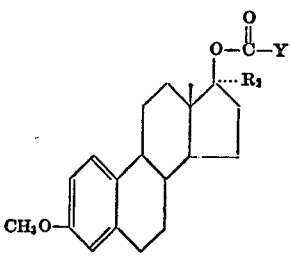

II–B wherein $R_2$ and Y are as above.

Further, in accordance with the invention, among the preferred compounds of formula III are the compounds of the formula:

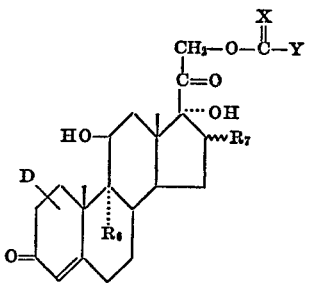

III–A wherein D, $R_6$, $R_7$, X and Y are as above;

especially compounds of the formula:

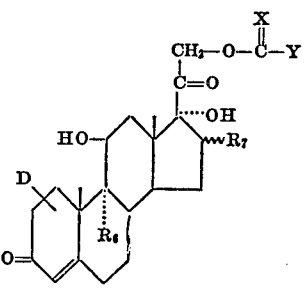

III–B wherein D, $R_6$, $R_7$ and Y are as above;

particularly compounds of the formula:

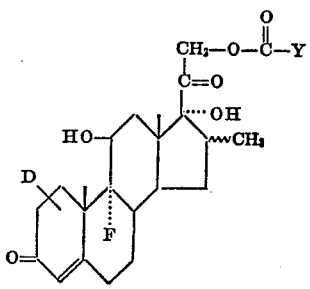

wherein D and Y are as above.

In accordance with another aspect of this invention, it has been surprisingly found that by treating a steroidal alcohol selected from the group consisting of compounds of the formulae:

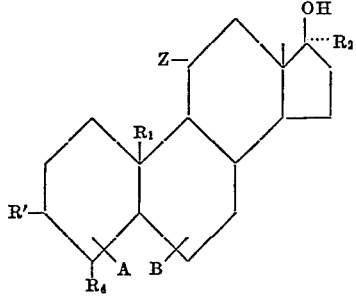

IV

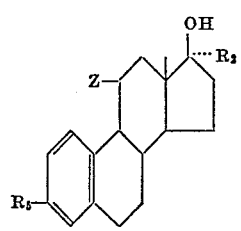

V and

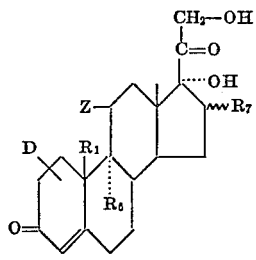

VI wherein A, B, D, Z, $R_1$, $R_2$, $R_4$, $R_5$, $R_6$ and $R_7$ are as above; and R' is oxo, acetoxy or carbamate;

with an N,N'-carbonyl or -thionecarbonyl-diazolide of the formula:

$$Y-\overset{X}{\underset{\|}{C}}-Y \qquad \text{VII}$$

wherein X and Y are as above;

a steroidal 17β- or 21-(azolide-1-carboxylate) of formula I, II or III is obtained rather than a 17β,17β'- or 21,21'-disteroidal carbamate. In carrying out this reaction, it is preferred to utilize an excess of the diazolide, 3 to 10 moles of the diazolide per mole of the steroidal alcohol being a particularly preferred excess of the diazolide. This reaction can be suitably carried out in an inert organic solvent. In carrying out this reaction, any conventional inert organic solvent can be utilized, such as ethers, aliphatic and aromatic hydrocarbons and chlorinated hydrocarbons. Among the preferred solvents are dioxane, benzene, and tetrahydrofuran. In carrying out this reaction, temperature and pressure are not critical, and the reaction can be carried out at a temperature of about 0° C. to the reflux temperature of the reaction mixture and at atmospheric pressure. Preferably, the reaction is carried out at about room temperature (22° C.).

Steroidal 17β- and 21-(azolide-1-carboxylates) of this invention can also be obtained by treating a steroidal aryl carbonate, preferably a phenylcarbonate selected from the group consisting of compounds of the formulae:

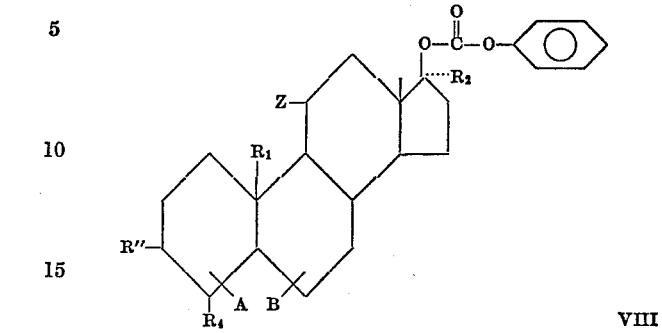

VIII

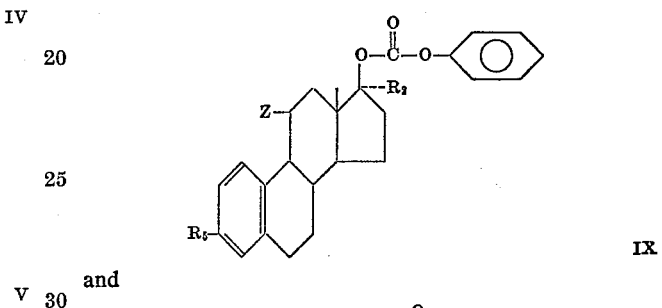

IX and

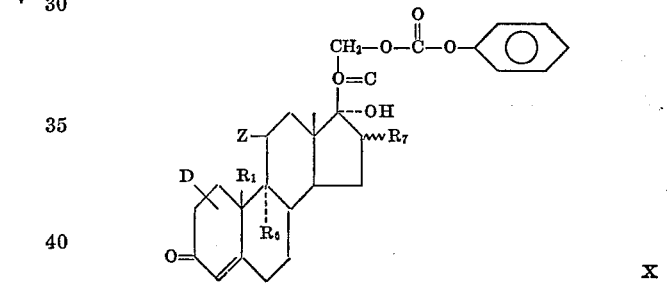

X wherein A, B, D, Z, $R_1$, $R_2$, $R_4$, $R_5$, $R_6$ and $R_7$ are as above; and R'' is hydroxy, oxo, acetoxy or carbamate;

with an azole compound. This reaction can be suitably carried out in an inert organic solvent. In this reaction, any conventional inert organic solvent can be utilized, such as dioxane, tetrahydrofuran and benzene. If desired, the reaction can be catalyzed by carrying out the reaction in the presence of an alkali metal lower alkoxide, preferably sodium methoxide. In carrying out this reaction, temperature and pressure are not critical, and the reaction can be carried out at a temperature of about 0° C. to 50° C. and at atmospheric pressure. The preferred reaction temperature is room temperature.

The compounds of formula VIII wherein R'' is oxo, acetoxy or carbamate and of formula IX and X can be obtained by treating a compound selected from the group consisting of compounds of formula IV, V and VI with phenylchloroformate. This reaction is preferably carried out in the presence of a tertiary amine which will react with and remove the HCl produced during the main reaction. In this reaction, any conventional tertiary amine can be utilized, with pyridine, triethylamine and collidine being preferred. This reaction can also be carried out in the presence of an inert organic solvent. In this reaction, any conventional inert organic solvent may be utilized. The aforementioned tertiary amines can also be utilized as the solvent medium, said amines being the preferred solvents. In carrying out this reaction, temperature and pressure are not critical, and in general, the reaction can be suitably carried out at a temperature of about 0° C. to 50° C. and atmospheric pressure. In carrying out this reaction, room temperature is preferred.

The compounds of formula VIII wherein R" is hydroxy can be obtained by treating the compound of formula VIII wherein R" is oxo with a reducing agent which selectively reacts with the 3-oxo substituent. In this reaction, any conventional, selective, 3-oxo reducing agent can be utilized with lithium aluminum, tri(tertiary butoxy) hydride being preferred. This reduction reaction can be suitably carried out in an inert organic solvent. In this reaction, any conventional inert organic solvent can be utlized, with diethyl ether and tetrahydrofuran being preferred. In this reaction, temperature and pressure are not critical, and in general, the reaction can be suitably carried out at room temperature and atmospheric pressure. In this reaction temperatures higher or lower than room temperature can also be utilized, with the reflux temperature of the reaction mixture being preferred.

The compounds of formula VIII wherein R" is carbamate can be obtained by treating a compound of the formula:

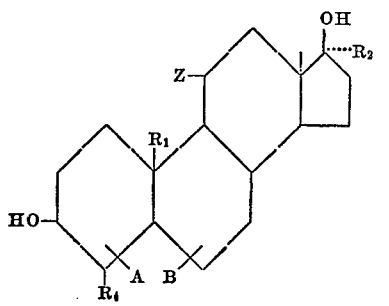

XI wherein A, B, Z, $R_1$, $R_2$ and $R_4$ are as above; with phenylchloroformate to form a compound of the formula:

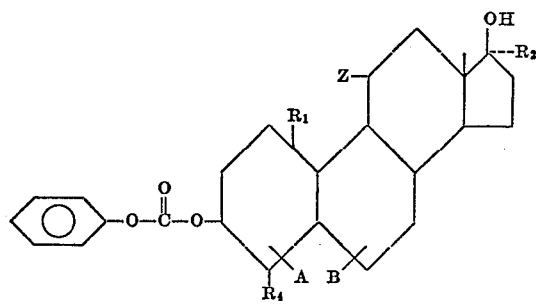

XII wherein A, B, Z, $R_1$, $R_2$ and $R_4$ are as above;

and treating the resulting compound of formula XII with an amine of the formula:

XIII wherein $R_9$ and $R_{10}$ are as above.

The compound of formula XI can be suitably treated with phenylchloroformate utilizing the procedure set forth above for treating compounds of formulae IV, V and VI with the phenylchloroformate to form the compound of formula XII, which can be isolated in a conventional manner during the work-up.

The reaction of the compound of formula XII with an amine of formula XIII can be suitably carried out in the presence of an inert organic solvent. Any conventional inert organic solvent such as diethyl ether or tetrahydrofuran can be utilized in this reaction. If desired, an excess of the liquid amine of formula XIII can also be suitably utilized as the solvent medium for the reaction. In carrying out this reaction, temperature and pressure are not critical, and in general, this reaction can be carried out at room temperature (22° C.) and at atmospheric pressure. In carrying out this reaction, temperatures higher or lower than room temperature can also be utilized, with the reflux temperature of the reaction mixture being preferred.

The steroidal 3-(azolide-1-carboxylates) of this invention can be obtained by treating a steroidal alcohol of the formula:

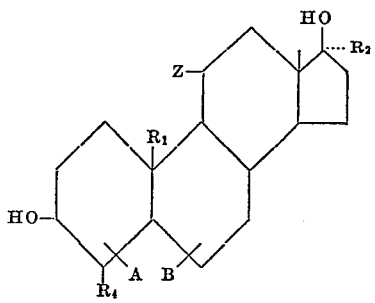

XIV wherein A, B, Z, $R_1$, $R_2$ and $R_4$ are as above;

with an N,N'-carbonyl or -thionecarbonyl-diazolide of formula VII. The reaction with the diazolide can suitably be carried out in the same manner as the reaction above of the steroidal alcohols of formula IV, V or VI with the diazolide of formula VII. The resulting 3-(azolide-1-carboxylates) can be isolated in a conventional manner during the work-up.

The compounds of this invention are characterized by endocrinological utility. Thus, the compounds of formulae I, II and III can be administered internally, for example, orally or parenterally, with dosage adjusted to individual requirements, in the form of conventional pharmaceutical preparations. For example, the compounds of formula I, II or III can be administered in conventional pharmaceutical solid or liquid forms, such as tablets, pills, capsules, solutions, suspensions, emulsions, or the like. These pharmaceutical preparations can contain the compounds of this invention as an active ingredient in concentrations of about 0.01% to 99% by weight. These pharmaceutical preparations can also contain conventional pharmaceutical carriers and excipients, such as water, talc, corn starch, polyalkylene glycols, emulsifying agents, buffering agents, agents for the adjustment of osmotic pressure, Vaseline and/or the like. Though it is preferred to administer the endocrinologically useful compounds of this invention internally, the progestationally useful compounds of formula I-E above can be administered topically. For this purpose, i.e., topical administration, these compounds can be administered in conventional topical administration forms, such as ointments or creams, in combination with conventional topical carriers such as petrolatum, stearic acid or the like. Also compositions containing an active ingredient of this invention can be subjected to conventional pharmaceutical processes such as sterilization or the like. Also, the pharmaceutical compositions of this invention can contain other active ingredients. Moreover, these endocrinologically active compounds can be administered as feed additives, and for this purpose can be admixed with conventional animal feeds or conventional animal premixes. Though as indicated, dosages of the endocrinologically useful compounds of this invention should be adjusted to individual needs, the compounds of this invention can be administered internally in daily dosage regimens of from about 0.005 mg./kg. to about 0.15 mg./kg. per day. These dosages can be administered in unit or divided dosage forms.

The androgenic and/or anabolic activity of compounds of formula I of this invention is shown in a procedure wherein five castrated rats weighing approximately 40–50 g. each are given either oral dosages or subcutaneous injections of the compound suspended in sesame oil, whereas a control group of five rats is administered the sesame oil vehicle only. After seven days of treatment all animals are autopsied, and weights of their ventral prostates and levator ani muscles are determined. The weight of their ventral prostates as compared to the control group of rats is the criterion used for determining androgenic activity. The weight of their levator ani as compared to the control group of rats is the criterion used for determining anabolic activity. The following compounds, when administered in the manner set forth above, showed androgenic and/or anabolic activity at dosages of 1.0 mg./day *per os*:

17α-methylandrost-4-ene-3β,17β-diol 3-(imidazole-1-thionecarboxylate);
19-nortestosterone imidazole-1-carboxylate;
17α-ethynyl-17β-hydroestr-4-en-3-one imidazole-1-carboxylate;
17α-methylandrost-5-ene-3β,17β-diol 3-(imidazole-1-thionecarboxylate;
testosterone imidazole-1-carpoxylate;
17α-methyltestosterone imidazole-1-carboxylate;
17β-hydroxyandrost-4-ene-3,11-dione imidazole-1-carboxylate;
17α-ethynyl-17β-hydroxyandrost-4-en-3-one imidazole-1-carboxylate;
estr-4-ene-3β,17β-diol 17-(imidazole-1-carboxylate); and
estr-4-ene-3β,17β-diol 17-(imidazole-1-carboxylate) 3-ethylcarbamate.

The progestational activity of the compounds of formula I of this invention is shown in the procedure wherein the compounds are administered to estrogen primed immature female rabbits for five days. The presence of progestational activity is shown by a secretory type endometrial response observed on histological sections prepared from the rabbits' uteri and examined microscopically. The following compounds, when administered in the manner set forth above, showed progestational activity at dosages of less than 400 μg./day *per os*:

17α-ethynyl-17β-hydroxyestr-4-en-3-one imidazole-1-carboxylate;
17α-ethynylestr-4-ene-3β,17β-diol 3-acetate 17-(imidazole-1-carboxylate); and
17α-ethynylandrost-4-ene-3-one imidazole-1-carboxylate.

The antigonadotropic activity of the compounds of formula I of this invention is shown in a procedure wherein the compounds are administered for ten days to immature male rats. At autopsy, the testes, seminal vesicles and ventral prostates are removed and their respective weights determined. The weights of these organs as compared with the control groups of rats is the criterion used for determining antigonadotropic activity. The following compounds, when administered in the manner set forth above, showed antigonadotropic activity at dosages of 1.0 mg./day *per os*:

19-nortestosterone imidazole-1-carboxylate;
17α-methylandrost-4-ene-3β,17β-diol 3-(imidazole-1-thionecarboxylate);
testosterone imidazole-1-carboxylate;
17α-methyltestosterone imidazole-1-carboxylate;
4-chloro-17β-hydroxyandrost-4-ene-3,11-dione imidazole-1-carboxylate; and
17β-hydroxyandrost-4-ene-3,11-dione imidazole-1-carboxylate.

The estrogenic activity of the compounds of formula II of this invention is shown in a procedure wherein the compounds are administered daily for three days to immature female rats. Uteri are removed at autopsy on the fourth day and weighed. The weights of the uteri as compared with the control group of rats is the criterion used for determining estrogenic activity. The following compounds showed estrogenic activity:

3-methoxyestra-1,3,5(10)-trien-17β-ol imidazole-1-carboxylate; and
17α-ethynyl-3-methoxyestra-1,3,5(10)-trien-17β-ol imidazole-1-carboxylate.

The thymolytic activity of the compounds of formula III of this invention is shown in a procedure wherein the compounds are administered daily for three days to immature rats. The thymus is removed from each rat at autopsy on the fourth day and weighed. The weight of the thymuses as compared with the control group of rats is the criterion used for determining thymolytic activity. The following compounds showed thymolytic activity at dosages of 100 μg. of less *per os*:

hydrocortisone 21-(imidazole-1-carboxylate);
9α-fluoro-11β,17α,21-trihydroxy-16β-methylpregna-1,4-diene-3,20-dione 21-(imidazole-1-carboxylate); and
9α-fluoro-11β,17α,21-trihydroxy-16α-methylpregna-1,4-diene-3,20-dione 21-(imidazole-1-carboxylate).

The examples which follow illustrate the invention. All temperatures are in degrees centigrade.

EXAMPLE 1

17α-Methylandrost-4-ene-3β,17β-diol 4-(imidazole-1-thionecarboxylate)

To a solution of 35.5 g. (0.52 mole) of imidazole in 280 ml. of alcohol-free chloroform (dried over $Al_2O_3$) was added over 15 min. a solution of 9.94 ml. (15.0 g., 0.13 mole) of thiophosgene in 100 ml. of dry benzene. The reaction was stirred at ambient temperature for one hour, the precipitate of imidazole hydrochloride was removed by filtration and washed with alcohol-free chloroform and the filtrate was diluted to 475 ml. with alcohol-free chloroform to give a solution of N,N'-thiocarbonyldiimidazole. One hundred milliliters of this solution were added to a solution of 2.00 g. (0.006 mole) of 17α-methylandrost-4-ene-3β,17β-diol in 50 ml. of tetrahydrofuran, and the reaction mixture was stirred at room temperature (22° C.) for 7 days. Ten milliliters of water were added dropwise, and the reaction mixture was diluted with dichloromethane, washed twice with water, dried and concentrated. The residue was chromatographed over silica gel in dichloromethane-hexane (1:1 parts by volume), and the column was eluted with dichloromethane to remove some unwanted materials. Elution with 2% ethyl acetate in dichloromethane to 15% ethyl acetate in dichloromethane gave product-containing fractions which were combined and recrystallized from dichloromethane-ether-hexane to give 17α-methylandrost-4-ene-3β,17β-diol 3-(imidazole-1-thionecarboxylate) as colorless crystals; M.P. 193.5–196.5°;

$$[\alpha]_D^{25°} = -78.64°$$

$(CHCl_3, c.=0.9295)$.

EXAMPLE 2

17α-Methylandrost-5-ene-3β,17β-diol 3-(imidazole-1-thionecarboxylate)

Two grams (0.0066 mole) of 17α-methylandrost-5-ene-3β,17β-diol were dissolved in 60 ml. of tetrahydrofuran, 150 ml. of the solution of N,N'-thiocarbonyldiimidazole from Example 1 were added, and the solution was stirred for six days. The reaction mixture was diluted with dichloromethane, washed with water, dried and concentrated to a solid residue. The residue was recrystallized from dichloromethane-diethyl ether to give 17α-methylandrost-5-ene-3β,17β-diol 3-(imidazole-1-thionecarboxylate) as colorless crystals; M.P. 191.5° (dec.);

$$[\alpha]_D^{25°} = -70.44°$$

$(CHCl_3, c.=0.5877)$.

EXAMPLE 3

Hydrocortisone 21-(imidazole-1-carboxylate)

A slurry of 2.00 g. (0.0055 mole) of hydrocortisone and 5.00 g. (0.031 mole) of N,N'-carbonyldiimidazole in 100 ml. of dry dioxane was stirred at room temperature. After a few minutes the reaction became homogeneous, and after one hour, it was poured into 1 l. of ice and water. The precipitate was collected by filtration and recrystallized from dichloromethane-acetone to give hydrocortisone 21-(imidazole-1-carboxylate) as colorless crystals; M.P. 180° (dec.-variable). Further recrystallization gave a sample of M.P. 177° (dec.-variable); $[\alpha]_D^{25°} = +200.1°$ (CHCl$_3$, c.=1.273).

EXAMPLE 4

9α-Fluoro-11β,17α,21-trihydroxy-16β-methylpregna-1,4-diene-3,20-dione 21-(imidazole-1-carboxylate)

An (initially heterogeneous) mixture of 1.00 g. (0.00255 mole) of 9α-fluoro-11β,17α,21-trihydroxy-16β-methylpregna-1,4-diene-3,20-dione, 2.50 g. (0.0154 mole) of N,N'-carbonyldiimidazole and 50 ml. of dry dioxane was stirred at room temperature. The reaction soon became homogeneous and after 75 min., was poured into 500 ml. of ice and water. The resulting precipitate was collected by filtration and dissolved in dichloromethane. The solution was dried and concentrated. The residue was recrystallized from acetone-ethyl acetate to give 9α-fluoro-11β,17α,21-trihydroxy-16β-methylpregna-1,4-diene-3,20-dione 21-(imidazole-1-carboxylate) as colorless crystals; M.P. 190° (dec.). Fourther recrystallization from ethyl acetate gave a sample of M.P. 190.5° (dec.);

$$[\alpha]_D^{25°} = +152.1°$$

(dioxane, c.=0.945).

EXAMPLE 5

9α-Fluoro-11β,17α,21-trihydroxy-16α-methylpregna-1,4-diene-3,20-dione 21-(imidazole-1-carboxylate)

A solution of 1.00 g. (0.00255 mole) of 9α-fluoro-11β,17α-21-trihydroxy-16α-methylpregna-1,4-diene-3,20-dione and 2.50 g. (0.0154 mole) of N,N'-carbonyldiimidazole in 50 ml. of dry dioxane was stirred at room temperature for one hour and poured into 500 ml. of ice and water. The resulting precipitate was collected by filtration and dissolved in dichloromethane-ethyl acetate. The solution was dried and concentrated to a crystalline residue. This was recrystallized from acetone to give 9α-fluoro-11β,17α,21-trihydroxy-16α-methylpregna-1,4-diene-3,20-dione 21-(imidazole-1-carboxylate) as colorless crystals; M.P. 200° (dec.). Further recrystallization of tetrahydrofuran-benzene gave a sample of M.P. 197° (dec.); $[\alpha]_D^{25°} = +123.1°$ (dioxane, c.=1.01).

EXAMPLE 6

19-nortestosterone imidazole-1-carboxylate

To a solution of 5.00 g. (0.018 mole) of 19-nortestosterone in 150 ml. of dioxane were added 14.75 g. (0.091 mole) of N,N'-carbonyldiimidazole, and the reaction was stirred at room temperature for 4 hrs. It was then slowly poured into 1.5 l. of ice and water and stirred for 20 min. The resulting solid was isolated by filtration and dissolved in dichloromethane. The solution was dried and evaporated to give a tan oil which was crystallized from diethyl ether (with charcoal) to give 19-nortestosterone imidazole-1-carboxylate as colorless crystals; M.P. 148–150°. Further recrystallization from dichloromethane-diethyl ether gave a sample of M.P. 150–151.5°;

$$[\alpha]_D^{25°} = +98.40°$$

(CHCl$_3$, c.=1.046).

EXAMPLE 7

19-nortestosterone phenylcarbonate

To a rapidly stirred solution of 31.00 g. (0.113 mole) of 19-nortestosterone in 1 l. of dry pyridine were added over 3 min., 63 ml. (78.5 g., 0.50 mole) of phenyl chloroformate. A gummy precipitate formed immediately which soon crystallized and was broken up by the stirrer. After the reaction had stirred overnight, it was poured into 10 ml. of ice and water. The resulting precipitate was collected by filtration and dissolved in dichloromethane. This solution was washed with water, dried and evaporated. The semi-crystalline residue was recrystallized from diethyl ether to give 19-nortestosterone phenylcarbonate as colorless crystals; M.P. 147–149°. Further recrystallization from ether-pentane gave a sample of M.P. 148–150°; $[\alpha]_D^{25°} = +35.23°$ (CHCl$_3$, c.=1.161).

EXAMPLE 8

19-Nortestosterone imidazole-1-carboxylate

A solution of 1.435 g. (3.6 mmoles) of 19-nortestosterone phenylcarbonate and 0.497 g. (17.3 mmoles) of imidazole in 30 ml. of dioxane was stirred at room temperature for 6 days. Over this time, 150 mg. of sodium methoxide was added in three portions. The reaction was poured into 400 ml. of ice and water and the resulting precipitate was collected by filtration and dissolved in dichloromethane. The solution was dried and concentrated and the residue was crystallized from dichloromethane-diethyl ether to give 19-nortestosterone imidazole-1-carboxylate as colorless crystals; M.P. 151–155°.

EXAMPLE 9

5α-Estran-17β-ol-3-one imidazole-1-carboxylate

A solution of 1.00 g. (3.62 mmoles) of 5α-estran-17β-ol-3-one and 3.00 g. (18.5 mmoles) of N,N'-carbonyldiimidazole in 30 ml. of dry dioxane was stirred at room temperature (22° C.) for 90 min. and then poured into 300 ml. of ice and water. The resulting precipitate was collected by filtration and dissolved in dichloromethane. The solution was dried and concentrated to give a crystalline residue. This was recrystallized from dichloromethane-diethyl ether to give 5α-estran-17β-ol-3-one imidazole-1-carboxylate as colorless crystals; M.P. 158.5–160.5°; $[\alpha]_D^{25°} = +85.24°$ (CHCl$_3$, c.=1.062).

EXAMPLE 10

Testosterone imidazole-1-carboxylate

A mixture of 5.00 g. (0.0174 mole) of testosterone and 14.0 g. (0.0864 mole) of N,N'-carbonyldiimidazole in 150 ml. of dioxane was stirred at room temperature (22° C.) overnight. The reaction was poured into 1.5 l. of ice and water and the resulting precipitate was collected by filtration and dissolved in dichloromethane. The solution was dried and concentrated to give a tan oil which was crystallized from dichloromethane-diethyl ether (charcoal) to give testosterone imidazole-1-carboxylate as colorless crystals; M.P. 168–171°. Further recrystallization from dichloromethane-ether gave a sample of M.P. 169–172°; $[\alpha]_D^{25°} = +146.4°$ (CHCl$_3$, c.=0.942).

EXAMPLE 11

17α-Methyltestosterone imidazole-1-carboxylate

A solution of 5.00 g. (0.0165 mole) of 17α-methyltestosterone and 150 ml. of dry benzene was heated under reflux under a column of molecular sieves (Types-4A) for 2 hours. To the cooled reaction was added 3.92 g. (0.024 mole) of N,N'-carbonyldiimidazole and a small piece of sodium. After the solution had stirred at room temperature for 13 days, the unreacted sodium was removed, and the reaction was diluted with diethyl ether, washed three times with water, dried and evaporated. The residue was crystallized from diethyl ether and recrystallized from dichloromethane-diethyl ether to give 17α-methyltestosterone imidazole-1-carboxylate as colorless crystals; M.P. 170–171.5° (dec.). Chromatography over silica gel (elution with 25% diethyl ether in benzene) followed by recrystallization from ethyl acetate gave a sample of M.P. 170.5° (dec.); $[\alpha]_D^{25°} = +104.4°$ (CHCl$_3$, c.=1.10).

EXAMPLE 12

19-Nortestosterone imidazole-1-thiocarboylate

To a stirring solution of 20.42 g. (0.300 mole) of imidazole in 160 ml. of alcohol-free chloroform (passed over alumina) was added 15 min. over a solution of 5.73 ml. (8.64 g., 0.075 mole) of thiophosgene in 60 ml. of dry benzene. After the reaction had stirred for one hour it was filtered through a sintered glass funnel. The precipitate of imidazole hydrochloride was washed with alcohol-free chloroform and the combined filtrates were diluted to 300 ml. with alcohol-free chloroform to give a stock solution of N,N′-thiocarbonyldiimidazole.

To 240 ml. of the above solution of N,N′-thiocarbonyldiimidazole were added 4.00 g. (0.0146 mole) of 19-nortestosterone and the resulting solution was allowed to stand at room temperature (22° C.) for 3 days. It was then poured into 500 ml. of ice and water. The aqueous layer was extracted twice with dichloromethane, and the combined organic layers were washed with water, dried and evaporated to leave an amber oil which was dissolved in ethyl acetate. This solution was filtered through a column of 20 g. of silica gel and evaporated. The residue was crystallized (with charcoal) from dichloromethane-ethyl acetate to give 19-nortestosterone imidazole-1-thiocarboxylate as colorless crystals: M.P. 142–144°. Elution of the product from a column of silica gel with 10% diethyl ether in dichloromethane followed by recrystallization from dichloromethane-diethyl ether gave a sample of M.P. 144–146°; $[\alpha]_D^{25°} = +80.46°$ ($CHCl_3$, c.=1.049).

EXAMPLE 13

19-Nortestosterone pyrazole-1-carboxylate

To a solution of 4.50 g. (0.0114 mole) of 19 nortestosterone phenylcarbonate and 4.68 g. (0.069 mole) of pyrazole in 135 ml. of tetrahydrofuran were added 0.25 g. of sodium methoxide. The reaction was stirred at room temperature (22° C.) for 1.5 hrs. and then poured into 1.5 l. of ice and water. The resulting precipitate was collected by filtration and dissolved in dichloromethane. The solution was dried and concentrated and the residue was crystallized from dichloromethane-diethyl ether with charcoal to give 19-nortestosterone pyrazole-1-carboxylate as colorless crystals; M.P. 168–170°; resolidification and remelting at 180–182°. Further recrystallization gave a sample of M.P. 180.5–182° after softening at 171°; $[\alpha]_D^{25°} = +99.48°$ ($CHCl_3$, c.=1.166).

EXAMPLE 14

19-Nortestosterone benzimidazole-1-carboxylate

To a solution of 1.00 g. (0.00254 mole) of 19-nortestosterone phenylcarbonate and 1.80 g. (0.0153 mole) of benzimidazole in 30 ml. of tetrahydrofuran were added 70 mg. of sodium methoxide. The reaction was stirred at room temperature (22° C.) for 3 hrs. and then poured into 400 ml. of ice and water. The resulting precipitate was collected by filtration and dissolved in dichloromethane. The solution was washed with water, dried and concentrated to give a yellow crystalline residue. This was recrystallized from dichloromethane-ethyl acetate with charcoal to give 19-nortestosterone benzimidazole-1-carboxylate as colorless crystals; M.P. 226–228°. $[\alpha]_D^{25°} = +93.52$ ($CHCl_3$, c.=0.9837).

EXAMPLE 15

Estr-4-ene-3β,17β-diol 17-phenylcarbonate

A solution of 8.28 g. (0.021 mole) of 19-nortestosterone phenylcarbonate and 11.08 g. (0.044 mole) of lithium aluminum tri-t-butoxyhydride in 260 ml. of tetrahydrofuran was stirred at room temperature (22° C.) for two hours. Twenty one milliliters of acetone were added, and 10 min. later, the reaction was poured into 2 l. of ice and water containing 10 ml. of acetic acid. The mixture was extracted 3 times with dichloromethane, and the extracts were washed with 5% aqueous sodium bicarbonate solution and water, dried and concentrated. The resulting yellow oil was crystallized from diethyl ether to give in several crops estr-4-ene-3β,17β-diol 17-phenylcarbonate as colorless crystals; M.P. 143–147°. Further recrystallization gave a sample of M.P. 147–148°; $[\alpha]_D^{25°} = +22.03°$ ($CHCl_3$, c.=1.321).

EXAMPLE 16

Estr-4-ene-3β,17β-diol 17-(imidazole-1-carboxylate)

To a solution of 6.28 g. (0.0159 mole) of estr-4-ene-3β,17β-diol 17-phenylcarbonate and 6.28 g. (0.093 mole) of imidazole in 250 ml. of tetrahydrofuran were added 0.50 g. of sodium methoxide. The reaction was stirred overnight at room temperature (22° C.) and then poured into 3 l. of ice and water. The resulting precipitate was collected by filtration and dissolved in dichloromethane. The solution was dried and concentrated to give a colorless crystalline residue. This was recrystallized from dichloromethane-diethyl ether to give estr-4-ene-3β,17β-diol 17-(imidazole-1-carboxylate); M.P. 178–180°, with resolidification and remelting at 191°–194°. Further recrystallization gave a sample of M.P. 180–181°; $[\alpha]_D^{25°} = +69.53°$ ($CHCl_3$, c.=0.9766).

EXAMPLE 17

Estr-4-ene-3β,17β-diol 17-(imidazole-1-carboxylate) 3-ethylcarbamate

To a solution of 2.40 g. (0.0065 mole) of estr-4-ene-3β,17β-diol 17-(imidazole-1-carboxylate) in 25 ml. of dry tetrahydrofuran were added 5.15 ml. (4.60 g., 0.065 mole) of ethyl isocyanate, and the reaction mixture was stirred at room temperature (22° C.) for 10 days. (About 20 min. after the addition of the isocyanate, a white precipitate formed which had redissolved after 6 days.) The reaction was poured into 300 ml. of ice and water, and the resulting precipitate was collected by filtration and dissolved in dichloromethane. The solution was dried and concentrated. The residue was crystallized from diethyl ether and recrystallized from dichloromethane-ethyl acetate to give estr-4-ene-3β,17β-diol 17-(imidazole-1-carboxylate) 3-ethylcarbamate as colorless crystals; M.P. 184–186°; $[\alpha]_D^{25°} = +22.06°$ ($CHCl_3$, c.=1.006).

EXAMPLE 18

4-Chloro-17β-hydroxyestr-4-en-3-one imidazole-1-carboxylate

A mixture of 0.805 g. (2.6 mmoles) of 4-chloro-17β-hydroxyestr-4-en-3-one and 2.1 g. (13 mmoles) of N,N′-carbonyldiimidazole in 25 ml. of dry dioxane was stirred at room temperature (22° C.) overnight. The reaction was poured into 500 ml. of ice and water, and the resulting precipitate was collected by filtration and dissolved in dichloromethane. The solution was dried and evaporated to a crystalline residue which was recrystallized from dichloromethane-diethyl ether to give 4-chloro-17β-hydroxyestr-4-en-3-one imidazole-1-carboxylate as colorless crystals; M.P. 197° (dec). Further recrystallization from ethyl acetate gave a sample of M.P. 197° (dec.); $[\alpha]_D^{25°} = +112.8°$ ($CHCl_3$, c.=1.085).

EXAMPLE 19

4-Chloro-17β-hydroxyandrost-4-ene-3,11-dione acetate

To a solution of 3.81 g. (0.011 mole) of 17β-hydroxyandrost-4-ene-3,11-dione acetate in 38 ml. of pyridine cooled to 8° C. were added over 10 min. 1.8 ml. (3.0 g., 0.022 mole) of sulfuryl chloride. The reaction was stirred at 6° C. for an additional 30 min. and then poured into a mixture of 400 ml. of ice and water and 42 ml. of concentrated hydrochloric acid. The resulting precipitate was collected by filtration and dissolved in dichloromethane. The solution was washed with water, 5% sodium bicarbonate and water, dried and concentrated. The residue was crystallized from dichloromethane-diethyl ether to give 4 - chloro-17β-hydroxyandrost-4-ene-3,11-dione acetate as colorless crystals; M.P. 231° (dec.). Further recrystallization from dichloromethane-methanol gave a sample of M.P. 252–254°; $[\alpha]_D^{25°} = +193.1°$ (CHCl$_3$, c.=1.155).

EXAMPLE 20

4-chloro-17β-hydroxyandrost-4-ene-3,11-dione

To a solution of 1.50 g. (0.04 mole) of 4-chloro-17β-hydroxyandrost-4-ene-3,11-dione acetate in 50 ml. of methanol, 20 ml. of tetrahydrofuran and 5 ml. of dichloromethane were added 5 ml. of 6 N hydrochloric acid. After standing at room temperature (22° C.) overnight a portion of the 4-chloro-17β-hydroxyandrost-4-ene-3,11-dione acetate had precipitated out. This was redissolved by the addition of 10 ml. of dichloromethane and 10 ml. of tetrahydrofuran. Another 5 ml. of 6 N hydrochloric acid were added, and after standing at room temperature (22° C.) for 3 days, the solution was concentrated to 25 ml. under vacuum at room temperature. It was then diluted with water and extracted with dichloromethane. The organic layer was washed with water, 5% aqueous sodium bicarbonate and water, dried and concentrated to a colorless foam. This was crystallized from diethyl ether and recrystallized from dichloromethane-diethyl ether to give 4-chloro-17β-hydroxyandrost-4-ene-3,11-dione as colorless crystals; M.P. 206–208° (dec.). Further recrystallization gave a sample of M.P. 209–210° (dec.); $[\alpha]_D^{25°} = +245.9°$ (CHCl$_3$, c.=0.9825).

EXAMPLE 21

4-Chloro-17β-hydroxyandrost-4-ene-3,11-dione imidazole-1-carboxylate

To a solution of 0.46 g. (1.37 mmoles) of 4-chloro-17β-hydroxyandrost-4-ene-3,11-dione in 15 ml. of dry dioxane were added 1.1 g. (6.85 mmoles) of N,N'-carbonyldiimidazole, and the heterogeneous mixture was stirred at room temperature (22° C.) for 5 days. The reaction was poured into 400 ml. of ice and water, and the resulting precipitate was collected by filtration and dissolved in dichloromethane. The solution was dried and concentrated to a tan foam. This was crystallized from dichloromethane-diethyl ether and recrystallized from dichloromethane-ethyl acetate to give 4-chloro-17β-hydroxyandrost-4-ene-3,11-dione imidazole-1-carboxylate as colorless crystals; M.P. 223–224° (dec.); $[\alpha]_D^{25°} = +224.9°$ (CHCl$_3$, c.=1.264).

EXAMPLE 22

17β-Hydroxyandrost-4-ene-3,11-dione imidazole-1-carboxylate

A mixture of 8.40 g. (0.028 mole) of 17β-hydroxyandrost-4-ene-3,11-dione, 17.0 g. (0.105 mole) of N,N'-carbonyldiimidazole, and 250 ml. of dry dioxane was stirred at room temperature (22° C.) for 3 days. The solution was poured with stirring into 3 l. of ice and water, and the resulting precipitate was collected by filtration. The solid was dissolved in dichloromethane, and the solution was dried and concentrated. The residue was crystallized from ethyl acetate-diethyl ether and recrystallized from dichloromethane-ether to give 17β-hydroxandrost-4-ene-3,11-dione imidazole - 1 - carboxylate as colorless crystals; M.P. 176–179°. Further recrystallization gave a sample of M.P. 176–178°; $[\alpha]_D^{25°} = +214.5°$ (CHCl$_3$, c.=1.197).

EXAMPLE 23

17α-Hydroxyprogesterone imidazole-1-carboxylate

A mixture of 4.00 g. (0.012 mole) of 17α-hydroxyprogesterone and 120 ml. of dry benzene was heated under reflux under a column of molecular sieves (Type 4A) for 2 hours. To the cooled mixture were added 2.87 g. of N,N'-carbonyldiimidazole and a small piece of clean sodium. Five days later, another 0.96 g. (0.024 mole total) of N,N'-carbonyldiimidazole were added, and stirring was continued for another 12 days. The reaction was filtered to remove 1.60 g. of unreacted starting material, and the filtrate was washed with water, dried and evaporated. The residue was recrystallized twice from dichloromethane-benzene to give another 1.41 g. of 17α-hydroxyprogesterone. The first dichloromethane-benzene mother liquor was concentrated and repeatedly recrystallized from dichloromethane - ether to give 17α - hydroxyprogesterone imidazole-1-carboxylate as colorless crystals; M.P. 203.5–205° (dec.); $[\alpha]_D^{25°} = +28.32°$ (CHCl$_3$, c.=1.190).

EXAMPLE 24

17α-Ethynyl-17β-hydroxyestr-4-en-3-one imidazole-1-carboxylate

A solution of 1.50 g. (0.005 mole) of 17α-ethynyl-17β-hydroxyestr-4-en-3-one and 4.07 g. (0.025 mole) of N,N'-carbonyldiimidazole in 45 ml. of dry dioxane was stirred at room temperature (22° C.) for 19 days. The solution was poured into 800 ml. of ice and water, and the resulting precipitate was collected by filtration and dissolved in dichloromethane. This solution was concentrated and chromatographed over silica gel. Later dichloromethane fractions, ether fractions and early ethyl acetate fractions (which contained only product by TLC) were combined and recrystallized from dichloromethane-ethyl acetate to give 17α-ethynyl-17β-hydroxyestr-4-en-3-one imidazole-1-carboxylate as colorless crystals; M.P. 208° (dec.); $[\alpha]_D^{25°} = +18.91°$ (CHCl$_3$, c.=1.174).

EXAMPLE 25

17α-Ethynyl-17β-hydroxyandrost-4-en-3-one imidazole-1-carboxylate

A heterogeneous mixture of 2.00 g. (0.0064 mole) of ethisterone, 5.19 g. (0.032 mole) of N,N'-carbonyldiimidazole and 75 ml. of dioxane was stirred at room temperature (22° C.) for 55 days. Pyridine (25 ml.) was added, and after stirring for an additional 6 days, the reaction was poured into 1.5 l. of ice and water. The resulting precipitate was collected by filtration and dissolved in dichloromethane. The solution was dried and concentrated. The residue was crystallized from dichloromethane and dichloromethane diethyl ether to give 0.40 g. of recovered ethisterone. The mother liquors were concentrated and crystallized from dichloromethane-ethyl acetate to give 17α-ethynyl-17β-hydroxyandrost-4-en - 3 - one imidazole-1-carboxylate as colorless crystals; M.P. 230–231° (dec.); $[\alpha]_D^{25°} = +67.16°$ (CHCl$_3$, c.=0.9827).

EXAMPLE 26

17α-Ethynylestr-4-ene-3β,17β-diol 3-acetate 17-(imidazole-1-carboxylate)

A heterogeneous mixture of 405 mg. (1.18 mmoles) of 17α-ethynylestr-4-ene-3β,17β-diol 3 - acetate and 2.0 g. (12.3 mmoles) of N,N'-carbonyldiimidazole in 25 ml. of dioxane was stirred at room temperature (22° C.) for 33 days. The reaction was then poured into 300 ml. of ice and water, and the resulting precipitate was collected by filtration and dissolved in dichloromethane. The solution was washed with water, dried, and evaporated to leave 0.48 g. of a yellow foam. This was crystallized from methanol and recrystallized from dichloromethane-diethyl ether to give 17α-ethynylestr-4-ene-3β,17β-diol 3-acetate 17-(imidazole-1-carboxylate) as colorless crystals; M.P. 172–174°; $[\alpha]_D^{25°} = -35.92°$ (CHCl$_3$, c.=1.119).

EXAMPLE 27

3-Methoxyestr-1,3,5(10)-trien-17β-ol imidazole-1-carboxylate

To a solution of 3.00 g. (0.0105 mole) of estradiol 3-methyl ether in 110 ml. of dioxane were added 8.55 g.

(0.053 mole) of N,N'-carbonyldiimidazole, and the reaction was stirred at room temperature (22° C.) for three days. It was then poured into 1 l. of ice and water, and the resulting precipitate was collected by filtration and dissolved in dichloromethane. The solution was dried and evaporated, and the resulting oil was crystallized from diethyl ether to give 3-methoxyestr-1,3,5(10)-trien-17β-ol imidazole-1-carboxylate as colorless crystals; M.P. 113–115°. Further recrystallization from dichloromethane-diethyl ether gave a sample of M.P. 115–116°; $[\alpha]_D^{25°} = +78.77$ (CHCl$_3$, c.=1.051).

EXAMPLE 28

17α-Ethynyl-3-methoxyestra-1,3,5(10)-trien-17β-ol imidazole-1-carboxylate

A heterogeneous mixture of 3.00 g. (0.0097 mole) of 17α-ethynyl-3-methoxyestra-1,3,5(10)-trien-17β - ol and 7.8 g. of N,N'-carbonyldiimidazole in 110 ml. of dry dioxane was stirred at room temperature (22° C.) for 38 days. Another 3.9 g. (0.072 mole total) of N,N'-carbonyldiimidazole were added, and three days later, the reaction mixture was filtered through a filter-aid to remove some dark residue. The filtrate was poured into 1.5 l. of ice and water, and the resulting precipitate was collected by filtration and dissolved in dichloromethane. The solution was washed with water, dried and evaporated to give a yellow oil which crystallized from diethyl ether. Recrystallization from dichloromethane-diethyl ether gave 17α-ethynyl-3-methoxyestra - 1,3,5(10) - trien - 17β-ol imidazole-1-carboxylate as colorless crystals; M.P. 159.5–160.5°; $[\alpha]_D^{25°} = +17.28°$ (CHCl$_3$, c.=1.013).

EXAMPLE 29

17α-methylandrost-4-ene-3β,17β-diol 3-phenylcarbonate

To a vigorously stirred solution of 15.00 g. (0.049 mole) of 17α-methylandrost-4-ene-3β,17β-diol in 600 ml. of pyridine was added over 30 min. 17.1 ml. of phenyl chloroformate. The reaction was stirred at room temperature (22° C.) for 2.75 hrs. and then poured into 8 l. of ice and water. The resulting precipitate was collected by filtration, washed with water, and dissolved in diethyl ether containing a little dichloromethane. The solution was dried over sodium sulfate and concentrated to give a colorless oil which was diluted to 250 ml. with tetrahydrofuran to give a stock solution of 17α-methylandrost-4-ene-3β,17β-diol 3-phenylcarbonate. Fifty milliliters of this stock solution was diluted with 50 ml. of tetrahydrofuran and mixed with 15 ml. of diethylamine. After standing at room temperature for 3 days, TLC indicated no reaction had taken place, and the phenylcarbonate was recovered by pouring the reaction into 500 ml. of ice and water. The resulting solid was dissolved in diethyl ether, dried over sodium sulfate, filtered over a short column of silica gel and concentrated. The residue was recrystallized from diethyl ether-hexane to give 17α-methylandrost-4-ene-3β,17β-diol 3-phenylcarbonate as colorless crystals; M.P. 140.5–142.5°; $[\alpha]_D^{25°} = +27.99°$ (CHCl$_3$, c.=1.2661).

EXAMPLE 30

17α-methylandrost-4-ene-3β,17β-diol 3-methylcarbamate

To a solution of 15 ml. of methylamine in 50 ml. of dioxane cooled to −70° was added a solution of the crude 17α-methylandrost-4-ene-3β,17β-diol 3-phenylcarbonate prepared in Example 29 from 3.00 g. (9.8 mmoles) of 17α-methylandrost-4-ene-3β,17β-diol in 50 ml. of dioxane. The solution was stirred at −70° C. for one hour and then at room temperature (22° C.) overnight. Most of the dioxane was removed under vacuum, and the residue was mixed with 250 ml. of ice and water. The resulting oil was isolated by decantation and dissolved in dichloromethane. The solution was dried and concentrated under vacuum. The residue was dissolved in hexane and adsorbed onto a silica gel column. Elution with 15% diethyl ether in hexane removed less polar impurities and elution with diethyl ether gave material rich in product. Recrystallization from diethyl ether-hexane gave 17α-methylandrost-4-ene-3β,17β-diol 3-methylcarbamate as colorless crystals; M.P. 98–104° C. with resolidification and remelting at M.P. 156.5–158.5° C.; $[\alpha]_D^{25°} = -14.77$ (CHCl$_3$, c.=0.975).

EXAMPLE 31

Capsules of the following formulations were prepared as described below:

| | Per capsule, mg. |
|---|---|
| 19-Nortestosterone imidazole-1-carboxylate | 5 |
| Lactose | 178 |
| Corn starch | 37 |
| Talc | 5 |
| Total weight | 225 |

The 19-nortestosterone imidazole-1-carboxylate was mixed with the lactose and corn starch in a suitable mixer. The mixture was then further blended by passing through a Fitzpatrick Comminuting Machine with a No. 1A screen with knives forward. The blended powder was then returned to the mixer, the talc added and blended thoroughly. The mixture was then filled into No. 4 hard shell gelatin capsules on a Parke Davis capsulating machine.

EXAMPLE 32

Utilizing the procedure of Example 31, capsules were prepared containing, instead of 19-nortestosterone imidazole-1-carboxylate, one of the following:

17α-ethynyl-17β-hydroxyestr-4-en-3-one imidazole-1-carboxylate;

17α-ethynyl-3-methoxyestra-1,3,5(10)-trien-17β-ol imidazole-1-carboxylate;

4-chloro-17β-hydroxyandrost-4-ene-3,11-dione imidazole-1-carboxylate;

17α-methylandrost-4-ene-3β,17β-diol 3-(imidazole-1-thionecarboxylate); and

9α-fluoro-11β,17β,21-trihydroxy-16α-methylpregna-1,4-diene-3,20-dione 21-(imidazole-1-carboxylate).

EXAMPLE 33

Suppositories of the following formulation were prepared as described below:

| | Per 1.3 gm. suppository, gm. |
|---|---|
| 19-Nortestosterone imidazole-1-carboxylate | 0.005 |
| Wecobee M* | 1.250 |
| Carnauba wax | 0.045 |

*E. F. Drew Company, 522 Fifth Ave., New York, N.Y.

The Wecobee M and the carnauba wax were melted in a suitable size glass lined container (stainless steel may also be used), mixed well and cooled to 45° C. The 19-nortestosterone imidazole-1-carboxylate which had been reduced to a fine powder with no lumps, was added and stirred until completely and uniformly dispersed. The mixture was then poured into suppository molds to yield supositories having an individual weight of 1.3 gms. The suppositories were then cooled and removed from the molds. They were individually wrapped in wax paper for packaging. (Foil may also be used.)

EXAMPLE 34

Utilizing the procedure of Example 33, suppositories were prepared containing, instead of 19-nortestosterone imidazole-1-carboxylate, one of the following:

17α-ethynyl-17β-hydroxyestr-4-en-3-one imidazole-1-carboxylate;

17α-ethynyl-3-methoxyestra-1,3,5(10)-trien-17β-ol imidazole-1-carboxylate;

4-chloro-17β-hydroxyandrost-4-ene-3,11-dione imidazole-1-carboxylate;

17α-methylandrost-4-ene-3β,17β-diol 3-(imidazole-1-thionecarboxylate); and

9α-fluoro-11β,17α,21-trihydroxy-16α-methylpregna-1,4-diene-3,20-dione 21-(imidazole-1-carboxylate).

EXAMPLE 35

Tablets of the following formulation were prepared as described below:

| | Per tablet, mg. |
|---|---|
| 19-Nortestosterone imidazole-1-carboxylate | 2.55 |
| Dicalcium phosphate, unmilled | 232.45 |
| Corn starch | 12.50 |
| Magnesium stearate | 2.50 |
| Total weight | 250.00 |

The 19-nortestosterone imidazole-1-carboxylate and corn starch were blended in a suitable size mixer. The mix was then blended with an equal quantity of dicalcium phosphate. The mixture was blended for five minutes with the balance of the dicalcium phosphate and magnesium stearate. The mixture was then compressed.

EXAMPLE 36

Utilizing the procedure of Example 35, tablets were prepared containing, instead of 19-nortestosterone imidazole-1-carboxylate, one of the following:

17α-ethynyl-17β-hydroxyestr-4-en-3-one imidazole-1-carboxylate;
17α-ethynyl-3-methoxyestra-1,3,5(10)-trien-ol imidazole-1-carboxylate;
4-chloro-17β-hydroxyandrost-4-ene-3,11-dione imidazole-1-carboxylate;
17α-methylandrost-4-ene-3β,17β-diol 3-imidazole-1-thionecarboxylate; and
9α-fluoro-11β,17α,21-trihydroxy-16α-methylpregna-1,4-diene-3,20-dione 21-(imidazole-1-carboxylate).

EXAMPLE 37

Tablets of the following formulation were prepared as described below:

| | Per tablet, mg. |
|---|---|
| 19-Nortestosterone imidazole-1-carboxylate | 25 |
| Dicalcium phosphate dihydrate, unmilled | 175 |
| Corn starch | 24 |
| Magnesium stearate | 1 |
| Total weight | 225 |

The 19-nortestosterone imidazole-1-carboxylate and corn starch were mixed together and passed through a No. 00 screen in Model "J" Fitzmill with hammers forward. This premix was then mixed with dicalcium phosphate and one-half of the magnesium stearate, passed through a No. 1A screen in Model "J" Fitzmill with knives forward, adn slugged. The slugs were then passed through a No. A2 plate in a Model "D" Fitzmill at slow speed with knives forward, and the remaining magnesium stearate was added. The mixture was mixed and compressed.

EXAMPLE 38

Utilizing the procedure of Example 37, tablets were prepared containing, instead of 19-nortestosterone imidazole-1-carboxylate, one of the following:

17α-ethynyl-17β-hydroxyestr-4-en-3-one imidazole-1-carboxylate;
17α-ethynyl-3-methoxyestra-1,3,5(10)-trien-17β-ol imidazole-1-carboxylate;
4-chloro-17β-hydroxyandrost-4-ene-3,11-dione imidazole-1-carboxylate;
17α-methylandrost-4-ene-3β,17β-diol 3-(imidazole-1-thionecarboxylate); and
9α-fluoro-11β,17α,21-trihydroxy-16α-methylpregna-1,4-diene-3,20-dione 21-(imidazole-1-carboxylate).

EXAMPLE 39

A 0.1% cream of the following formulation was prepared as described below.

| | Mg. per gram |
|---|---|
| 19-Nortestosterone imidazole-1-carboxylate | 1.00 |
| Stearyl alcohol | 100.00 |
| Cetyl alcohol | 15.00 |
| White petrolatum | 70.00 |
| Methyl parahydroxybenzoate, USP | 2.00 |
| Propyl parahydroxybenzoate, USP | 0.50 |
| Isopropyl palmitate | 60.00 |
| Polyoxyl 40 stearate, USP | 40.00 |
| Propylene glycol | 120.00 |
| Disodium versenate | 0.10 |
| Distilled water | 597.16 |

The stearyl alcohol, cetyl alcohol, petrolatum, propyl parahydroxybenzoate, isopropyl palmitate and polyoxyl 40 stearate were melted at 75° C. The mixture was then cooled to and maintained at 70° C. Disodium versenate and methyl parahydroxybenzoate were dissolved in hot distilled water to which was added to propylene glycol. The solution was then mixed at 75° C. and slowly added to the oil solution prepared previously, using slow agitation. The emulsion was then gradually cooled with slow stirring. When the temperature of the ointment reached 55° C., the 19-nortestosterone imidazole-1-carboxylate was added and mixed with the ointment. When the temperature of the ointment reached 50° C., cold water was circulated in the jacket of the kettle and the ointment was cooled at 30° C. with stirring. The ointment was then transferred to storage containers.

EXAMPLE 40

Utilizing the procedure of Example 39, 0.1% creams were prepared containing, instead of 19-nortestosterone imidazole-1-carboxylate, one of the following:

17α-ethynyl-17β-hydroxyestr-4-en-3-one imidazole-1-carboxylate;
17α-ethynyl-3-methoxyestra-1,3,5(10)-trien-17β-ol imidazole-1-carboxylate;
4-chloro-17β-hydroxyandrost-4-ene-3,11-dione imidazole-1-carboxylate;
17α-methylandrost-4-ene-3β-diol 3-(imidazole-1-thionecarboxylate); and
9α-fluoro-11β,17α,21-trihydroxy-16α-methylpregna-1,4-diene-3,20-dione 21-(imidazole-1-carboxylate).

I claim:
1. A compound of the formula:

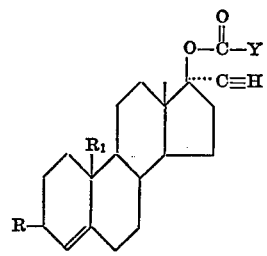

wherein R is oxo; $R_1$ is hydrogen or methyl; and Y is a 1-substituted-azolide.

2. The compound of claim 1 wherein $R_1$ is hydrogen.
3. The compound of claim 1 wherein $R_1$ is methyl.
4. The compound of claim 1 wherein said compound is 17α-ethynyl-17β-hydroxyandrost-4-en-3-one imidizole-1-carboxylate.
5. The compound of claim 2 wherein said compound is 17α-ethynyl-17β-hydroxyestr-4-en-3-one imidazole-1-carboxylate.

6. A process for obtaining a compound of the formula:

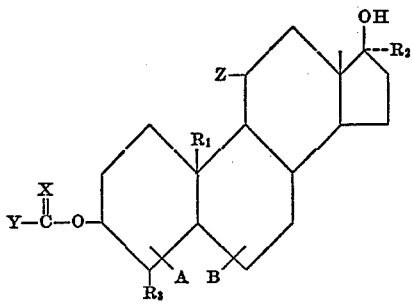

wherein $R_1$ is hydrogen or methyl; $R_2$ is hydrogen, lower alkyl or ethynyl; $R_3$ is hydrogen or chlorine; A is a $\Delta^{4(5)}$-unsaturated bond or B is a $\Delta^{5(6)}$-unsaturated bond; X is sulfur or oxygen; Y is an azolide; and Z is hydrogen, oxo or hydroxy;

comprising treating a compound of the formula:

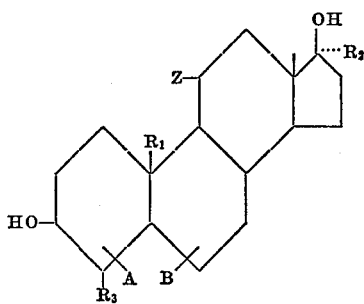

wherein $R_1$, $R_2$, $R_3$, A, B and Z are as above;

with a N,N'-carbonyldiazolide of the formula:

wherein X and Y are as above.

7. The process of claim 6 wherein the process is carried out at from about 0° C. to reflux.

8. A process for obtaining a compound selected from the group consisting of compounds of the formulae:

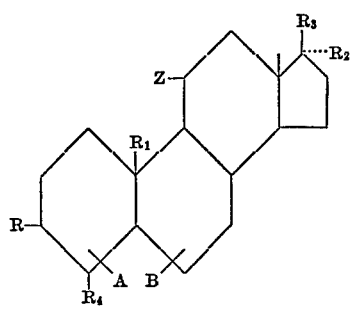

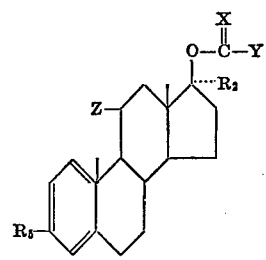

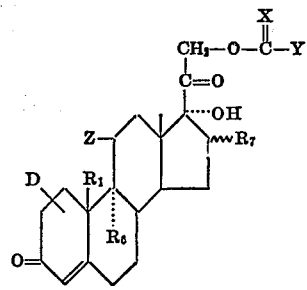

wherein R is hydroxy, oxo, acetoxy, or carbamate; $R_1$ is hydrogen or methyl; $R_2$ is hydrogen lower alkyl or ethynyl; $R_3$ is hydroxy or

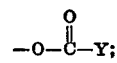

$R_4$ is hydrogen or chlorine; $R_5$ is lower alkoxy or cycloalkoxy; $R_6$ is hydrogen or fluorine; $R_7$ is hydrogen or lower alkyl; X is sulfur or oxygen; Y is a 1-substituted-azolide; Z is hydrogen, hydroxy or oxo; A is a $\Delta^{4(5)}$-unsaturated bond or B is a $\Delta^{5(6)}$-unsaturated bond; and D can be a $\Delta^{1(2)}$-unsaturated bond;

comprising reacting a compound selected from the group consisting of compounds of the formulae:

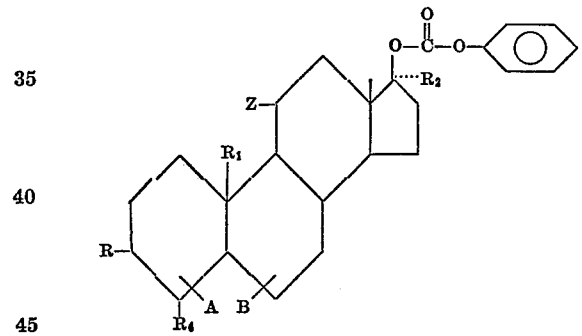

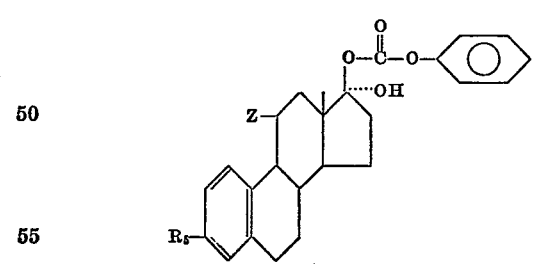

and

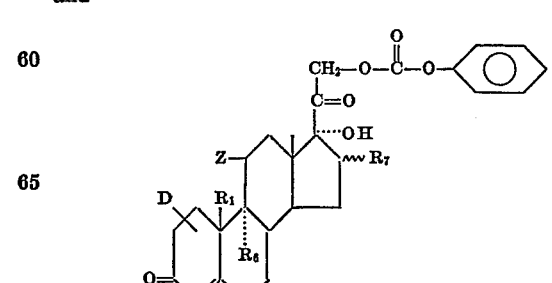

wherein R, $R_1$, $R_2$, $R_4$, $R_5$, $R_6$, $R_7$, A, B and D are as above;

with an azole compound.

9. The process of claim 8 wherein said reaction is carried out at about 0° C. to about 50° C.

References Cited
UNITED STATES PATENTS

| | | | |
|---|---|---|---|
| 2,889,318 | 6/1959 | Bergstrom | 260—239.5 |
| 3,057,856 | 10/1962 | Zirm et al. | 260—239.5 |
| 3,167,544 | 1/1965 | Heider et al. | 260—239.5 |
| 3,314,856 | 4/1967 | Allais et al. | 167—74 |
| 3,424,746 | 1/1969 | Schneider | 260—239.5 |
| 3,478,019 | 11/1969 | Edwards | 260—239.55 |
| 3,558,607 | 1/1971 | Gueritee | 260—239.5 |
| 3,558,675 | 1/1971 | Sarett et al. | 260—397.4 |

HENRY A. FRENCH, Primary Examiner

U.S. Cl. X.R.

260—397.4, 397.45, 397.5; 424—241